United States Patent [19]

Atkins et al.

[11] 4,436,112

[45] Mar. 13, 1984

[54] FUEL PRESSURE REGULATOR

[75] Inventors: Terrance J. Atkins, Rochester; Martin J. Field, Churchville, both of N.Y.

[73] Assignee: General Motors Corporation, Detroit, Mich.

[21] Appl. No.: 410,651

[22] Filed: Aug. 23, 1982

[51] Int. Cl.³ .............................................. F16K 31/12
[52] U.S. Cl. .................................. 137/510; 92/98 R; 267/177
[58] Field of Search .......................... 137/510, 505.41; 92/98 R; 267/177; 188/170

[56] References Cited

U.S. PATENT DOCUMENTS 3,324,872  6/1967  Cloud .......................... 137/505.41 X
3,471,087  10/1969  Caparone ................... 137/505.41 X
3,863,841  2/1975  Berthoud ....................... 137/510 X

*Primary Examiner*—Harold W. Weakley
*Attorney, Agent, or Firm*—C. K. Veenstra

[57] ABSTRACT

The fuel supplied to an injector is maintained at substantially constant pressure by a fuel pressure regulator which balances the fuel pressure with the bias of a coil spring. To establish the desired pressure, a spring housing is deformed to move a spring seat to the position which causes the spring to exert the required bias. The spring seat is connected to the diaphragm by a tie rod which simplifies assembly of the pressure regulator. Slits in the outer portion of the diaphragm allow separation of the diaphragm along an arcuate line while maintaining a continuous peripheral seal about the pressure regulator.

4 Claims, 10 Drawing Figures

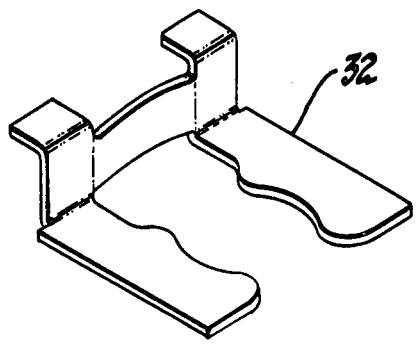
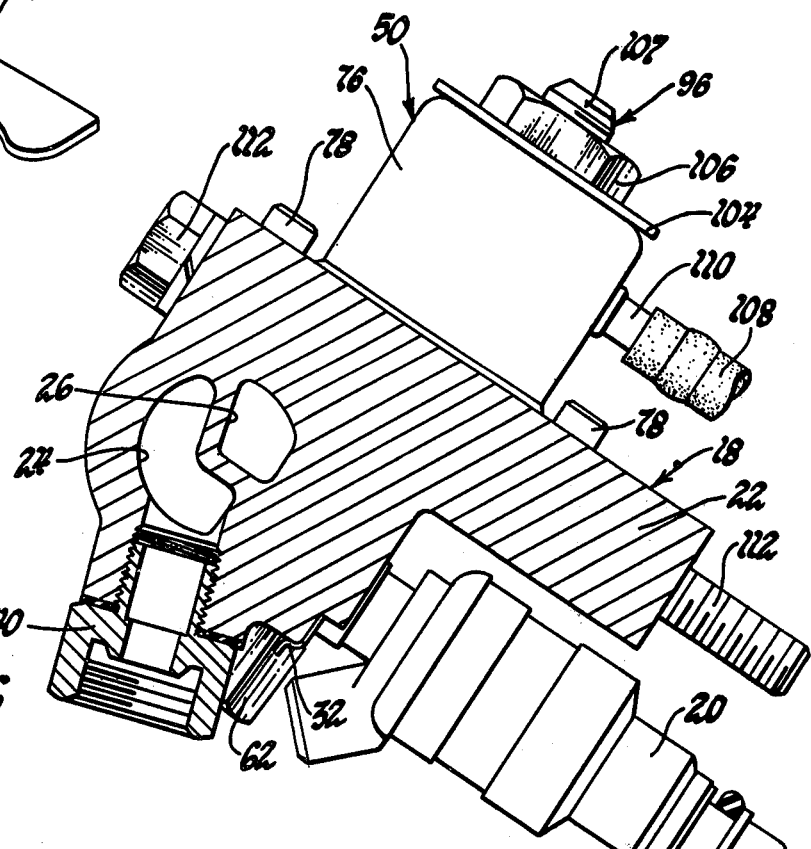
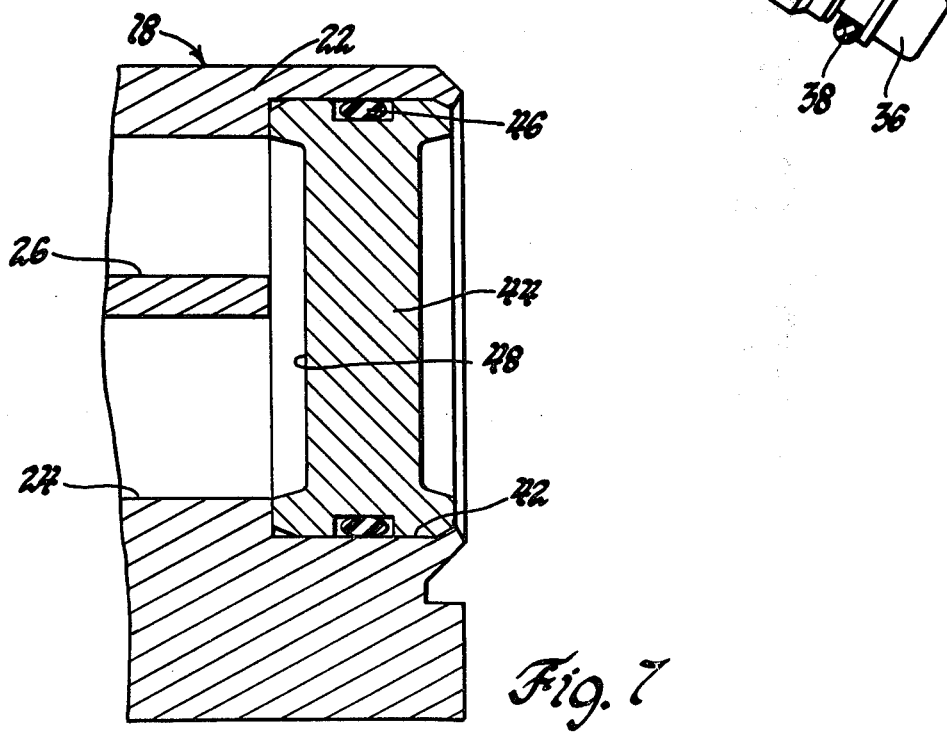

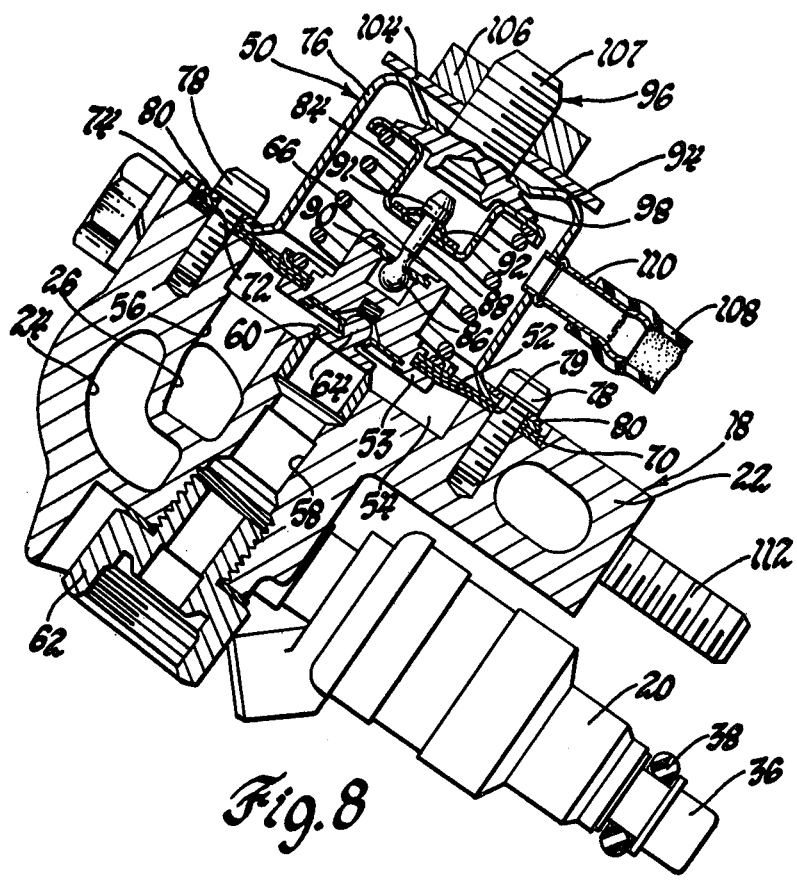
Fig. 8
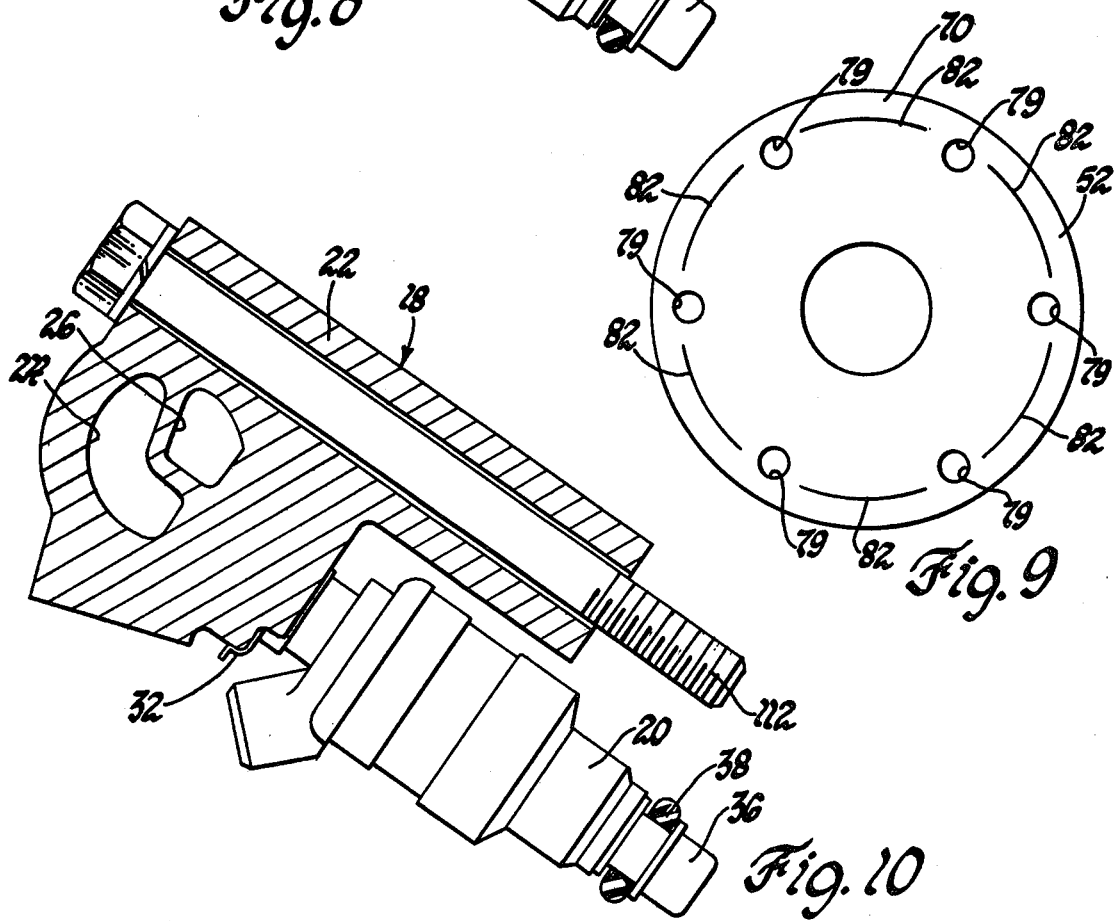
Fig. 9
Fig. 10

FUEL PRESSURE REGULATOR

TECHNICAL FIELD

This invention relates to a fuel pressure regulator employed in fuel injection apparatus.

BACKGROUND

In several prior fuel injection systems having a pump which supplies fuel to a fuel injector, the pump supplies more fuel than is required by the injector, and the excess fuel is discharged through a fuel pressure regulator represented, for example, by U.S. Pat. No. 3,511,270. The fuel pressure regulator has a diaphragm which balances the pressure of the fuel supplied to the injector with the bias of a pressure regulator spring. If the pressure of the fuel supplied to the injector is less than the spring bias, the diaphragm positions a valve to shut off the excess fuel flow and thus increase the fuel pressure at the injector; if the pressure of the fuel supplied to the injector exceeds the spring bias, the diaphragm retracts the valve to discharge the excess fuel and thus reduce the fuel pressure at the injector.

It is evident, therefore, that the fuel pressure at the injector is determined by the bias of the pressure regulator spring, and the desired fuel pressure is established by adjusting the bias of the spring. Prior fuel pressure regulators included an adjusting screw which adjusted the spring bias by moving a seat that engages the end of the spring.

SUMMARY OF THE INVENTION

In the fuel pressure regulator provided by this invention, the spring bias is adjusted by deforming the base of a housing surrounding the spring and the spring seat. As the base of the housing is deformed, the spring seat is moved to increase the spring bias and thus increase the fuel pressure.

With such a structure, the base of the housing may be deformed too far, increasing the spring bias and thus the fuel pressure beyond the desired setting. To compensate for over-deformation, this invention provides a structure for retracting the base to reduce the spring bias and thus the fuel pressure to the desired setting.

This invention also provides means to simplify assembly of a fuel pressure regulator diaphragm, spring and spring seat in a spring housing. In a fuel pressure regulator according to this aspect of the invention, a tie rod is secured to the diaphragm and engages the spring seat to limit movement of the spring seat away from the diaphragm. The spring seat and spring are thereby captured with the diaphragm and may be readily assembled with the spring housing to a pressure regulator base.

This invention further provides a diaphragm structure which maintains a continuous peripheral seal about the pressure regulator even in the event of undue distortion of the diaphragm. During normal operation the rim of the pressure regulator diaphragm provides an annular sealing region between flanges on the pressure regulator base and spring housing and is clamped between the flanges by fasteners which pass through apertures in the rim of the diaphragm. If the diaphragm is unduly distorted, the rim of the diaphragm may separate along a radial line from one of the apertures, thereby breaking the peripheral seal between the flanges. In a pressure regulator according to this aspect of the invention, however, the diaphragm has slits extending peripherally between and spaced peripherally from the apertures. With this diaphragm, undue distortion results in separation of the diaphragm along an arcuate line between one of the slits and one of the apertures instead of along a radial line from one of the apertures, and the diaphragm maintains a continuous peripheral seal between the flanges.

The details of the preferred embodiment as well as other features and advantages of this invention are set forth in the remainder of the specification and are shown in the accompanying drawings.

SUMMARY OF THE DRAWINGS

FIG. 5 is a view of a clip employed to secure each injector to the fuel rail.

FIG. 6 is a sectional view taken along line 6—6 of FIG. 3 showing the connection of the fuel supply line to the fuel rail.

FIG. 7 is a view of one end of the fuel rail with parts broken away to show the recessed plug which connects the fuel supply passage to the fuel return passage.

FIG. 8 is a sectional view taken along line 8—8 of FIG. 3 showing the fuel pressure regulator and the connection of the fuel return line to the fuel rail.

FIG. 9 is a plan view of the pressure regulator diaphragm.

FIG. 10 is a sectional view taken along line 10—10 of FIG. 3 showing a bolt which secures the fuel rail to the manifold.

THE PREFERRED EMBODIMENT

Figure 1:
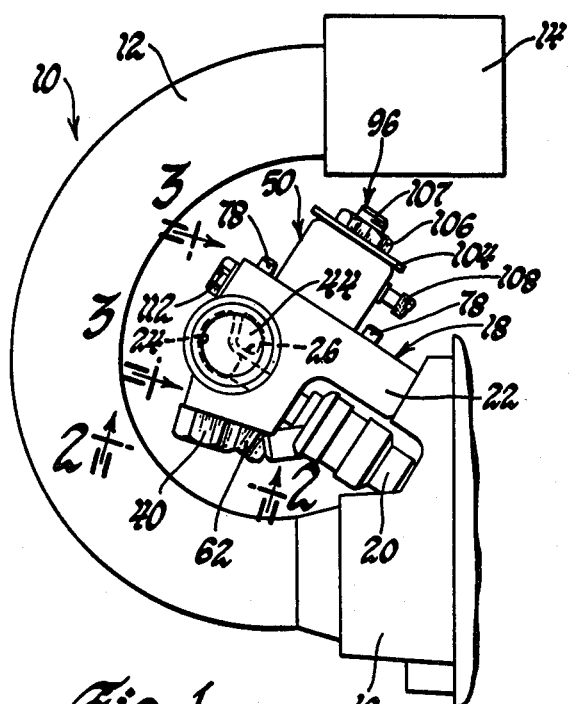
FIG. 1 is an end view of a fuel rail according to this invention mounted on an engine manifold.

Referring to the drawings, the inlet manifold 10 of an automotive spark ignition engine has a plurality of ram tubes 12 extending from a plenum 14 to a mounting pad 16 adjacent the inlet ports for the engine combustion chambers (not shown). A fuel rail 18 is secured on mounting pad 16 and has a plurality of injectors 20 each of which delivers fuel through an opening in mounting pad 16 to one of the inlet ports.

Figure 4:
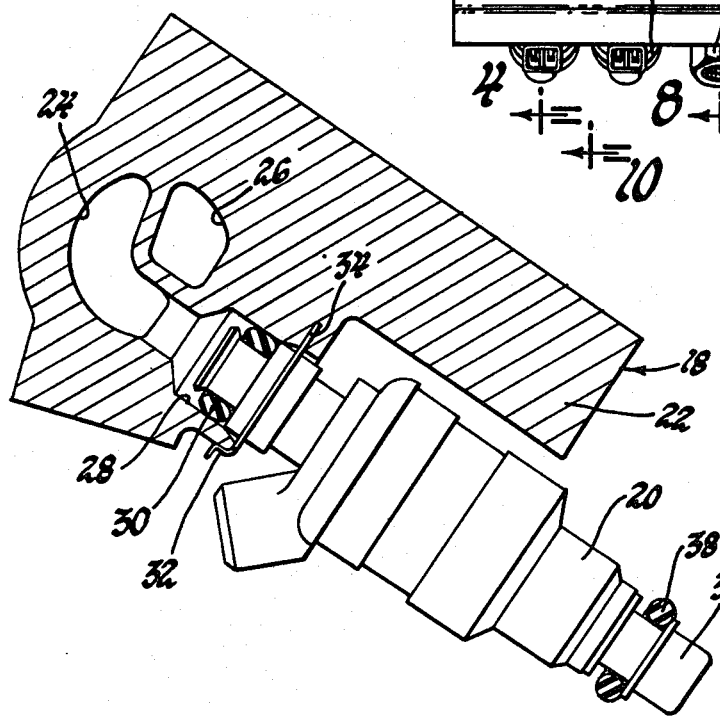
FIG. 4 is a sectional view taken along line 4—4 of FIG. 3 showing the interconnection of an injector and the fuel rail.

Fuel rail 18 has an elongated body 22 extruded to form a fuel supply passage 24 and a fuel return passage 26. As shown in FIG. 4, a plurality of injector sockets 28 machined in the fuel rail body 22 are intersected by the lower portion of fuel supply passage 24. Each socket 28 receives an injector 20, with an O-ring 30 sealing the injector-socket interconnection. Each injector 20 is retained in its socket 28 by a clip 32 which surrounds the injector and which is received in a slot 34 machined in the fuel rail body 22. The tip 36 of each injector 20 is received in an opening in manifold mounting pad 16 and has an O-ring 38 to seal the injector-mounting pad interconnection.

Figure 2:
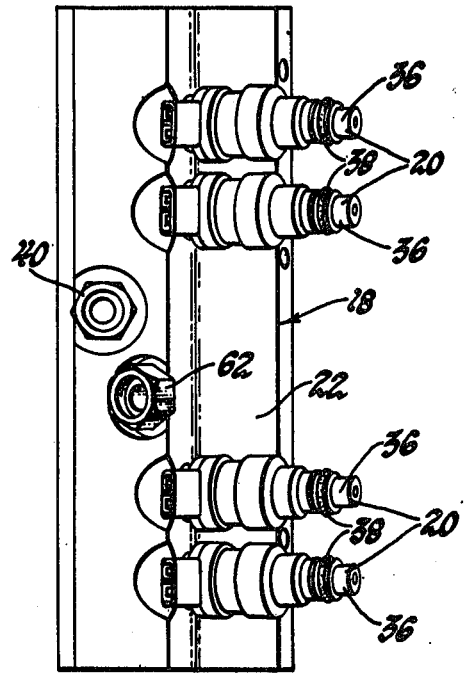
FIG. 2 is an axial view of the fuel rail indicated by the line 2—2 of FIG. 1 but shown removed from the manifold.
Figure 3:
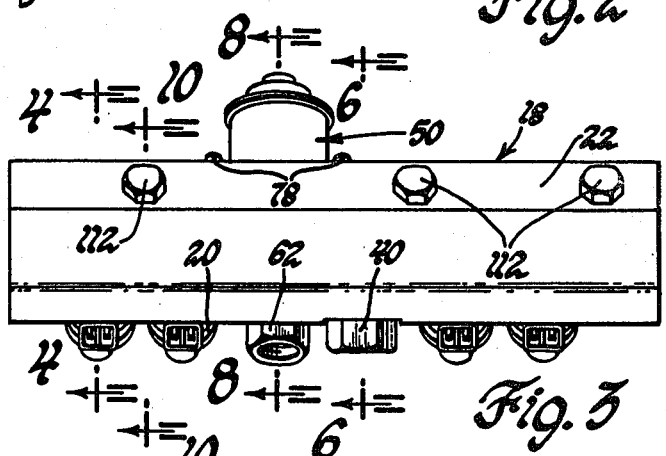
FIG. 3 is an axial view of the fuel rail indicated by the line 3—3 of FIG. 1 but shown removed from the manifold.

Fuel rail 18 has a connection 40 for a line to supply fuel to passage 24. As shown in FIGS. 2 and 3, the fuel supply line connection 40 opens into fuel supply passage 24 toward the middle of fuel rail 18 between two of the injector sockets 28. Fuel entering passage 24 from fuel supply line connection 40 thus flows through passage 24 toward both ends of fuel rail 18.

As shown in FIG. 7, each end of the fuel rail body 22 has a circular recess 42 intersected by and encompassing the associated ends of fuel supply passage 24 and fuel return passage 26. Each recess 42 receives a circular plug 44 sealed by an O-ring 46 to provide a single closure for the associated ends of both fuel passages 24 and 26. Each plug 44 has a recess 48 which interconnects supply passage 24 with return passage 26. The recess 48 in each plug 44 is calibrated so that the fuel flow from fuel supply line connection 40 toward one end of fuel rail 18 is proportioned to the number of injector sockets 28 between connection 40 and that end of fuel rail 18 and so that the fuel flow from fuel supply line connection 40 towad the other end of fuel rail 18 is proportioned to the number of injector sockets 28 between connection 40 and that other end of fuel rail 18. In the specific embodiment of the fuel rail shown in the drawings, there are two injector sockets 28 between connection 40 and each end of fuel rail 18, and plugs 44 have equally sized recesses 48 so that half the fuel flow is directed toward each end of fuel rail 18. However, if connection 40 were located so that there was one injector socket between connection 40 and one end of the fuel rail and three injector sockets between connection 40 and the other end of the fuel rail, recesses 48 would be sized to direct one-quarter of the fuel toward the one injector socket and three-quarters of the fuel toward the other three injector sockets. Moreover, if the fuel rail had only three injector sockets 28, connection 40 would be located so that one injector socket was between connection 40 and one end of the fuel rail and two injector sockets were between connection 40 and the other end of the fuel rail, and recesses 48 would be sized to direct one-third of the fuel toward the one injector socket and two-thirds of the fuel toward the other two injector sockets.

Fuel injectors 20 preferably are conventional electromagnetic fuel injectors energized by a conventional electronic control unit (not shown). Each injector 20 receives fuel from its socket 28 and, when energized, delivers a timed pulse of fuel for mixture with the air which flows to the combustio chambers through manifold 10.

As may be seen in FIGS. 4, 6, 8 and 10, the vertical dimension of fuel supply passage 24 substantially exceeds the horizontal dimension of fuel supply passage 24. Any fuel vapor entrained in the liquid fuel flowing through supply passage 24 thereby collects in the upper portion of supply passage 24, and injector sockets 28 receive only liquid fuel from the lower portion of supply passage 24.

The configuration of supply passage 24 is irregular, one side of supply passage 24 being outwardly convex and conforming substantially to the outline of recesses 42 at the ends of fuel rail 18. The other side of fuel supply passage 24 is outwardly concave, generally conforming to the configuration of and embracing return passage 26. This construction provides a compact fuel rail permitting the smallest possible recesses 42 to encompass supply passage 24 and return passage 26.

As shown in FIG. 8, the body 22 of fuel rail 18 provides a base for a pressure regulator 50. Pressure regulator 50 has a pair of diaphragms 52 which overlie one another to form a single diaphragm unit and which are clamped to and carry a central diaphragm retainer plate 53. Diaphragms 52 overlie body 22 to define a fuel chamber 54. A fuel access region 56 opens from fuel return passage 26 to fuel chamber 54, and a fuel outlet 58 opens from fuel chamber 54 through a valve seat 60 to a fuel return line connection 62. Diaphragm retainer plate 53 carries a valve member 64 which cooperates with valve seat 60, and a spring 66 biases diaphragms 52 to engage valve member 64 with valve seat 60. Pressure regulator 50 controls fuel flow past valve seat 60 to balance the fuel pressure in chamber 54 on diaphragms 52 with the bias of spring 66 to thereby maintain a substantially constant fuel pressure in chamber 54 and thus in fuel return passage 26 and fuel supply passage 24.

Diaphragms 52 have an annular sealing region 70 disposed between an annular flange 72 formed in fuel rail body 22 and an annular flange 74 of a pressure regulator spring housing 76. Fastening studs 78 extend through apertures 79 in sealing region 70 to clamp sealing region 70 between flanges 72 and 74. In this particular embodiment a backing ring 80 is secured between the heads of studs 78 and flange 74.

As shown in FIG. 9, each diaphragm 52 has a plurality of slits 82 which extend peripherally around sealing region 70 between apertures 79. The ends of slits 82 are spaced from apertures 79, and slits 82 are located within sealing region 70 slightly outboard of the center of apertures 79. During normal operation, slits 82 have no effect. However, in the event of undue distortion of one of the diaphragms 52, the diaphragm separates along an arcuate line between one of slits 82 and one of the apertures 79 instead of tearing along a radial line from one of apertures 79. Diaphragms 52 thereby maintain a continuous peripheral seal between flanges 72 and 74.

As shown in FIG. 8, the base of spring 66 engages a spring seat 84. A head 86 of a tie rod 88 is captured by a ring 90 secured to diaphragm retainer plate 53, and a bead 91 on tie rod 88 is captured behind spring seat 84 by a push nut 92. Tie rod 88 thus limits movement of spring seat 84 away from diaphragm retainer plate 53 to simplify assembly of pressure regulator 50. Tie rod 88 initially has a tail extending from bead 91; the tail is not shown here because it is removed after securing push nut 92 to tie rod 88.

The base 94 of spring housing 76 overlies spring seat 84 and carries a stud 96 having a flange 98 engaging spring seat 84. Base 94 is axially deformable to move spring seat 84 away from tie rod bead 91 and toward diaphragm plate 53; spring 66 is thereby compressed to increase the bias on diaphragms 52 and thus increase the fuel pressure in chamber 54. In the event that the base 94 of spring housing 76 is overdeformed and overcompresses spring 66, a washer 104 may be placed over base 94 and a nut 106 may then be threaded on the stem 107 of stud 96 to draw flange 98 toward washer 104; base 94 is thereby retracted to compensate for the overdeformation. Washer 104 and nut 106 may then be removed from pressure regulator 50 if so desired.

A hose 108 is connected between a fitting 110 on spring housing 76 and the engine induction system to vent the interior of spring housing 76.

As shown in FIGS. 1, 3 and 10, fuel rail 18 is secured to manifold mounting pad 16 by three bolts 112.

It will be appreciated that each of the various features of the fuel pressure regulator depicted here may be used without employing all of the remaining features. In combination, however, they provide a fuel pressure regulator of particularly advantageous construction.

Features of the fuel rail depicted here were invented by T. J. Atkins, M. J. Field and D. J. Lamirande as claimed in copending application D-6010. Other features employed in the fuel rail depicted here were invented by L. H. Weinand as claimed in copending application D-5728.

The embodiments of the invention in which an exclusive property or privilege is claimed are defined as follows:

1. A fuel pressure regulator comprising a diaphragm overlying a base and defining a fuel chamber therebetween, said base including a fuel access region opening to said chamber and a fuel outlet opening from said chamber and a valve seat surrounding said outlet, said diaphragm carrying a valve member controlling fuel flow past said valve seat through said outlet, a coil spring engaging said diaphragm and biasing said diaphragm to urge said valve member toward said valve seat whereby fuel flow past said valve seat through said outlet is controlled to balance the fuel pressure on said diaphragm with the bias of said spring on said diaphragm, a spring housing surrounding said coil spring, both said base and said housing having an annular flange and said diaphragm having an annular sealing region disposed between said flanges, said sealing region having a plurality of peripherally spaced apertures receiving fasteners which clamp said sealing region between said flanges, and wherein said sealing region has slits extending peripherally between and spaced peripherally from said apertures, whereby undue distortion of said diaphragm results in separation of said diaphragm along an arcuate line between one of said slits and one of said apertures instead of along a radial line from one of said apertures, said diaphragm thereby maintaining a continuous seal between said flanges.

2. A fuel pressure regulator comprising a diaphragm overlying a base and defining a fuel chamber therebetween, said base including a fuel access region opening to said chamber and a fuel outlet opening from said chamber and a valve seat surrounding said outlet, said diaphragm carrying a valve member controlling fuel flow past said valve seat through said outlet, a coil spring having one end engaging said diaphragm and biasing said diaphragm to urge said valve member toward said valve seat whereby fuel flow past said valve seat through said outlet is controlled to balance the fuel pressure on said diaphragm with the bias of said spring on said diaphragm, a spring seat engaging the other end of said coil spring, a spring housing surrounding said coil spring and said spring seat, and a tie rod having one end secured to said diaphragm, the other end of said tie rod being adapted to engage said spring seat for limiting movement of said spring seat away from said diaphragm, whereby said coil spring is captured between said spring seat and said diaphragm to simplify assembly of said pressure regulator.

3. A fuel pressure regulator comprising a diaphragm overlying a base and defining a fuel chamber therebetween, said base including a fuel access region opening to said chamber and a fuel outlet opening from said chamber and a valve seat surrounding said outlet, said diaphragm carrying a valve member controlling fuel flow past said valve seat through said outlet, a coil spring having one end engaging said diaphragm and biasing said diaphragm to urge said valve member toward said valve seat whereby fuel flow past said valve seat through said outlet is controlled to balance the fuel pressure on said diaphragm with the bias of said spring on said diaphragm, a spring seat engaging the other end of said coil spring, and a spring housing surrounding said coil spring and said spring seat, the position of said spring seat being axially adjustable within said housing to vary the bias of said coil spring on said diaphragm, said spring housing having a base overlying said spring seat, said base being axially deformable to adjust said spring seat to the position required to establish the desired fuel pressure in said chamber, and wherein said pressure regulator includes a stem extending from said base and a flange underlying said base, said stem being adapted to receive a washer overlying said base and a member effective to draw said flange toward said washer to compensate for over-deformation of said base toward said spring seat.

4. A fuel pressure regulator comprising a diaphragm overlying a base and defining a fuel chamber therebetween, said base including a fuel access region opening to said chamber and a fuel outlet opening from said chamber and a valve seat surrounding said outlet, said diaphragm carrying a valve member controlling fuel flow past said valve seat through said outlet, a coil spring having one end engaging said diaphragm and biasing said diaphragm to urge said valve member toward said valve seat whereby fuel flow past said valve seat through said outlet is controlled to balance the fuel pressure on said diaphragm with the bias of said spring on said diaphragm, a spring seat engaging the other end of said coil spring, a spring housing surrounding said coil spring and said spring seat, a tie rod having one end secured to said diaphragm, the other end of said tie rod being adapted to engage said spring seat for limiting movement of said spring seat away from said diaphragm, whereby said coil spring is captured between said spring seat and said diaphragm to simplify assembly of said pressure regulator, the position of said spring seat being axially adjustable within said housing to vary the bias of said coil spring on said diaphragm, said spring housing having a base overlying said spring seat, said base being axially deformable to adjust said spring seat to the position required to establish the desired fuel pressure in said chamber, wherein said pressure regulator includes a stem extending from said base and a flange underlying said base, said stem being adapted to receive a washer overlying said base and a member effective to draw said flange toward said washer to compensate for over-deformation of said base toward said spring seat, both said base and said housing having an annular flange and said diaphragm having an annular sealing region disposed between said flanges, said sealing region having a plurality of peripherally spaced apertures receiving fasteners which clamp said sealing region between said flanges, and wherein said sealing region has slits extending peripherally between and spaced peripherally from said apertures, whereby undue distortion of said diaphragm results in separation of said diaphragm along an arcuate line between one of said slits and one of said apertures instead of along a radial line from one of said apertures, said diaphragm thereby maintaining a continuous seal between said flanges.

* * * * *